(No Model.)
J. H. SAVILL.
COUPLING FOR WATER CLOSETS.
No. 526,088.     Patented Sept. 18, 1894.
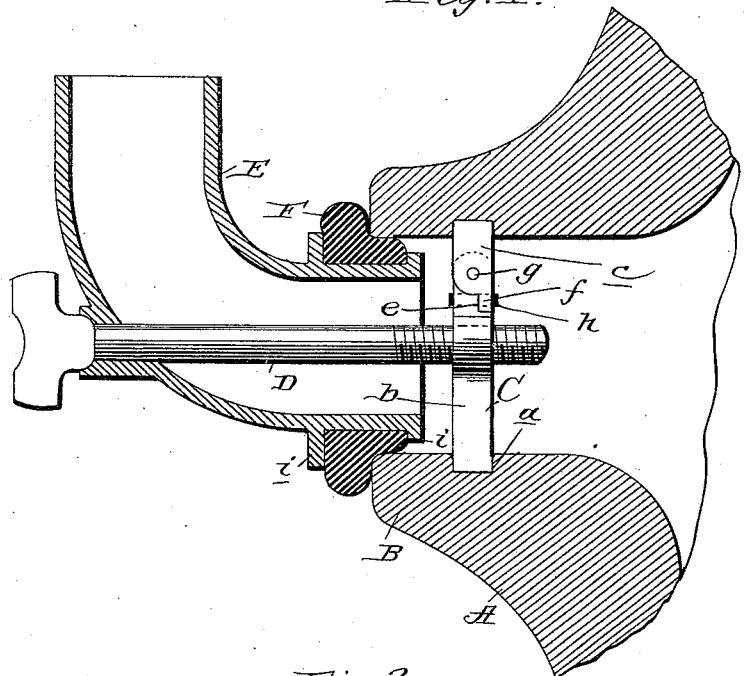
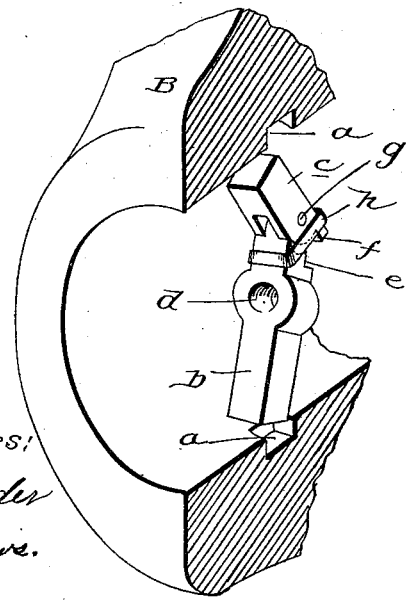
Witnesses:
C. H. Daeder
K. F. Matthews.
Inventor
J. H. Savill.
By James J. Sheehy
Attorney

UNITED STATES PATENT OFFICE.

JOSEPH H. SAVILL, OF PHILADELPHIA, PENNSYLVANIA.

COUPLING FOR WATER-CLOSETS.

SPECIFICATION forming part of Letters Patent No. 526,088, dated September 18, 1894.

Application filed November 27, 1893. Serial No. 492,138. (No model.)

*To all whom it may concern:*

Be it known that I, JOSEPH H. SAVILL, a citizen of the United States, residing at Philadelphia, in the county of Philadelphia and State of Pennsylvania, have invented certain new and useful Improvements in Couplings for Wash-Bowl Water-Closets; and I do declare the following to be a full, clear, and exact description of the invention, such as will enable others skilled in the art to which it appertains to make and use the same.

My invention relates to improvements in couplings for connecting pipe sections to water closet bowls or hoppers or to other frangible devices; and it has for its general object to provide such a coupling adapted to effect a yielding connection between a pipe section and a water closet bowl or hopper so that when the bowl or hopper sinks from any cause or is jarred, the boss thereof will not be broken or the connection between the pipe section and the bowl impaired.

With the foregoing end in view, the invention will be fully understood from the following description and claims when taken in connection with the annexed drawings, in which—

Figure 1, is a sectional view illustrating my improved coupling as connecting a pipe section to the boss of a water closet bowl or hopper, and Fig. 2, is a perspective view, partly in section illustrating the manner of placing the metallic bearing or nut for the connecting bolt in the keeper notches or seats of the boss.

Referring by letter to said drawings:—A, indicates a porcelain water-closet-bowl which may be of any form and construction, and B, indicates the boss, with which such bowls are ordinarily provided. This boss B, may be of the usual or any approved form and it is provided in its interior, preferably at diametrically opposite points, with depressions or seats $a$, which are designed and adapted to receive the metallic bearing or nut C, of my improved coupling. In some cases the nut or bearing C, may be formed in one piece and permanently secured in the boss of the bowl when the same is made, but I prefer as a rule to make it in two sections $b$, $c$, as better illustrated in Fig. 2. The section $b$, of said nut or bearing C, is provided with a threaded aperture or bore $d$, for the reception of the threaded bolt or rod D, (presently described) and it has its inner side notched or recessed adjacent to its upper end as shown at $e$, for the engagement of the reduced end $f$, of the section $c$, to which section it is flexibly connected by a bolt $g$, or by any other suitable device, whereby it will be seen that the nut or bearing may be flexed, as shown in Fig. 2, and readily seated in the depressions $a$. In order to prevent a casual flexing of the nut or bearing C, in operation, I provide the same with a band $h$, which is designed to surround the reduced end $f$, of the section $c$, and the section $b$, as better shown in Fig. 1. This band $h$, may be elastic so as to permit the nut or bearing to flex as shown, under pressure, but I do not desire to be understood as confining myself to an elastic band, as a non-elastic band could be employed to prevent flexing and could be moved away from the section $b$, when desired so as to permit the nut to flex. The elastic band is however preferable since it tends to cause the section $c$, to spring into its respective section when it arrives opposite the same.

E, indicates a pipe section, and F, indicates a cushion or cushion-washer which surrounds the pipe section and bears against the boss B. This cushion or washer may be formed from rubber or other yielding or elastic substance and may be secured upon the pipe section in any approved manner as by the collar flanges $i$, and it serves to render the connection between the pipe section and boss water tight and also serves to render such connection yielding and cushions the boss so as to prevent breakage thereof in case the bowl or hopper is jarred or sinks from any cause. The said washer or gasket also serves to cushion the boss and prevent breakage thereof in case the pipe section is jarred or moved.

D, indicates the bolt or rod for connecting the pipe section E, to the nut or bearing C, and the boss. This rod or bolt D, takes through the said pipe section E, and is provided with threads to engage the threaded aperture or bore $d$, of the nut section $b$, whereby it will be seen that the connection between the pipe section and the boss may be readily tightened or loosened by simply turning the said rod or bolt.

In the practice of my invention, the nut or bearing C, may be separately placed in position in the manner illustrated in Fig. 2, and the bolt or rod turned into said nut so as to connect the pipe section thereto, or, if desired the nut or bearing may be turned upon the bolt and the whole placed in position with respect to the boss at the same time.

It will be obvious to those skilled in the art that my improved coupling is far preferable to the rigid coupling or connection now in use, and that it will save many bowls which would otherwise be broken and rendered useless, and it will also be noticed that my improved coupling is very simple and cheap and that it serves efficiently to effect the purposes stated.

Having described my invention, what I claim is—

1. In a coupling, the combination of a bowl or hopper, a nut or bearing secured in said bowl or hopper and having a threaded aperture or bore, a pipe section, a cushion resting between the pipe section and the bowl or hopper and a rod or bolt taking through the pipe section and having threads to engage the threaded aperture or bore of the nut or bearing, substantially as and for the purpose set forth.

2. In a coupling, the combination of a water-closet bowl or similar fixture of frangible material having depressions as a nut or bearing seated in the said depressions and comprising two sections flexibly connected together, a pipe section, a cushion carried by said pipe section and adapted to bear against the bowl, and a bolt or rod adapted to connect the pipe section and the nut or bearing, substantially as specified.

3. In a coupling the combination of a water-closet bowl or similar fixture of frangible material having a boss provided with depressions in its inside, a nut or bearing comprising two flexibly connected sections and a band surrounding the sections arranged in the said depressions, a pipe section, a cushion washer carried by said pipe section and adapted to rest between the same and the boss, and a rod or bolt connecting the pipe section and the nut or bearing, substantially as specified.

4. In a coupling, the combination of a water closet bowl or similar fixture of frangible material having depressions as $a$, a nut or bearing arranged in said depressions and comprising a section having its inner side notched or recessed at its inner end, and another section flexibly connected to the first named section and having its inner end reduced to engage the recess of said section, a pipe section, a cushion washer resting between the pipe section and the bowl and a rod or bolt connecting the pipe section and the nut or bearing, substantially as and for the purpose set forth.

5. The herein described coupling consisting of a nut or bearing comprising a section having its inner side notched or recessed at its inner end and another section flexibly connected to the first named section and having its inner end reduced to engage the recess of said section, a pipe section, a cushion carried by said pipe section and a bolt or rod connecting the pipe section and the nut or bearing, substantially as specified.

In testimony whereof I affix my signature in presence of two witnesses.

JOSEPH H. SAVILL.

Witnesses:
W. SAVILL,
GEO. W. CLEMENT.